(12) United States Patent
Kopf

(10) Patent No.: US 7,471,598 B2
(45) Date of Patent: Dec. 30, 2008

(54) APPARATUS AND METHOD FOR COPYING DATA

(75) Inventor: Reiner Kopf, Karlsbad (DE)

(73) Assignee: Nero AG, Karlsbad (DE)

( * ) Notice: Subject to any disclaimer, the term of this patent is extended or adjusted under 35 U.S.C. 154(b) by 954 days.

(21) Appl. No.: 10/854,291

(22) Filed: May 26, 2004

(65) Prior Publication Data

US 2005/0265168 A1 Dec. 1, 2005

(51) Int. Cl.
*G11B 7/00* (2006.01)
(52) U.S. Cl. ............... 369/47.12; 369/84; 369/47.22
(58) Field of Classification Search ............... None
See application file for complete search history.

(56) References Cited

U.S. PATENT DOCUMENTS

| | | | | |
|---|---|---|---|---|
| 5,321,826 | A * | 6/1994 | Ushiro | 711/162 |
| 6,253,021 | B1 | 6/2001 | Yagi et al. | |
| 6,278,834 | B1 | 8/2001 | Yagi et al. | |
| 6,282,363 | B1 | 8/2001 | Yagi et al. | |
| 6,393,206 | B1 | 5/2002 | Yagi et al. | |
| 6,404,980 | B1 | 6/2002 | Yagi et al. | |
| 2001/0046377 | A1 | 11/2001 | Yagi et al. | |
| 2002/0141738 | A1 | 10/2002 | Yagi et al. | |
| 2004/0071446 | A1 | 4/2004 | Yagi et al. | |
| 2004/0223740 | A1 * | 11/2004 | Itoi | 386/95 |

FOREIGN PATENT DOCUMENTS

| | | |
|---|---|---|
| CA | 2 376 090 | 10/2004 |
| JP | 10-40666 | 2/1998 |
| JP | 2001035083 A | 2/2001 |
| JP | 2001-325770 | 11/2001 |
| JP | 2002-109831 | 4/2002 |
| JP | 2003-023513 | 1/2003 |
| JP | 2003-109307 | 4/2003 |
| JP | 2003-153170 | 5/2003 |
| WO | WO 99/65241 | 12/1999 |

OTHER PUBLICATIONS

XP 000694547; IBM Technical Disclosure Bulletin; Hard Disk Cache Alterations for Digital Versatile/Video Disks; vol. 40 No. 03 Mar. 1997; p. 165.
XP-002318338; DVD Format/Logo License at a Glance; 2 pages.

* cited by examiner

*Primary Examiner*—Wayne Young
*Assistant Examiner*—Lixi Chow
(74) *Attorney, Agent, or Firm*—Harness, Dickey & Pierce, P.L.C.

(57) ABSTRACT

The present invention relates to an apparatus for copying the data content of a source multi-session DVD-storage medium to a destination multi-session DVD-storage medium, wherein the data content is organized in sessions and files, and each session contains a file allocation table storing at least the physical start address of each file within a session, and wherein the address space between two adjacent sessions on said DVD-storage media is different. The apparatus comprises a read unit for reading data from said first storage medium, a write unit for writing data on said second storage medium, and a controller unit for controlling said read unit and said write unit. An address converting unit adapted to analyze the file allocation table of each session and to apply a predetermined address offset to each address in the file allocation table before writing said data to the second storage medium is also provided. The invention also relates to a method for copying the data content of a source medium to a destination medium.

21 Claims, 1 Drawing Sheet

APPARATUS AND METHOD FOR COPYING DATA

BACKGROUND OF THE INVENTION

The present invention relates to an apparatus for copying the data content of a source multi-session DVD-storage medium to a destination multi-session DVD-storage medium, wherein the data content is organized in sessions and files, and each session contains a file allocation table storing at least the physical start address of each file within a session, and wherein the address space between two adjacent sessions on said DVD-storage media is different, the apparatus comprising a read unit for reading data from said source storage medium, a write unit for writing data on said destination storage medium and a controller unit for controlling said read unit and said write unit.

The present invention also relates to a method for copying the data content of a source multi-session DVD-storage medium to a destination multi-session DVD-storage medium.

DVDs are becoming more and more popular as media for storing large amounts of data. Most of the presently available computer systems already comprise at least a DVD player or even a DVD burner. Although the handling of the DVD storage medium is easy, the user is confronted with different DVD standards which are not compatible to each other. Hence, the user may have the problem that a DVD created with a DVD burner in one computer may not be read by another DVD player.

Presently, there are two main standards for recordable DVDs, namely the DVD+R (DVD+RW) and the DVD-R (DVD-RW) standard. The differences between both standards are generally known so that it is refrained from describing them in detail here.

Although the DVD medium is originally designed for storing data in one single session, i.e. within one continuous time period, presently available DVD storage media allow to store data in multiple sessions, i.e. in different not continuous time periods. Such DVD media are called multi-session DVD storage media.

As already mentioned before, the user is confronted with the problem of non-compatibility between the different DVD standards. Hence, there is a demand for means which allow to overcome this deficiency.

SUMMARY OF THE INVENTION

It is, therefore, an object of the present invention to provide a method and an apparatus which alleviate the problems caused by the different DVD standards.

This object is solved by an apparatus as defined above which comprises an address converting unit adapted to analyze the file allocation table of each session and to apply a predetermined address offset to each address in the file allocation table before writing said data to the storage medium.

The inventive apparatus allows the user to easily prepare a 1:1 copy from one DVD standard into the other standard. I.e. in other words, the user may copy the data content of e.g. a DVD-R storage medium to e.g. a DVD+R storage medium (or vice versa) easily and without any data loss. Hence, the user may overcome the problem caused by incompatibility by copying and converting data on a DVD storage medium. It is to be noted that DVD-R and DVD+R are presently the main standards and the present invention is particularly useful with these standards. Nevertheless, the present invention is not limited thereto. The invention may always be applied when the address space of adjacent sessions on the source medium is different to that of the destination medium. This may e.g. be the case also for future standards like "blue ray" etc. Further, it is to be noted that a DVD-R storage medium containing multiple sessions is also called "multi-border" DVD rather than "multi-session" DVD. In the context of the present invention, a storage medium containing multiple sessions is generally called "multi-session" medium. Further, in the context of the present invention, "file allocation table" generally means a table for storing at least start addresses of files rather than exactly a FAT as used in standard file systems.

In a preferred embodiment of the invention, the address converting unit is adapted to select said address offset dependent on the physical start address of the session on the destination storage medium.

I.e. that it is taken into account that the physical address space between two adjacent sessions on a DVD-R storage medium (the difference between the physical end address of one session and the physical start address of the following session) is variable and depends on the position of the session to be stored on the DVD-R storage medium.

The object of the present invention is also solved by a method comprising the steps of reading the data of a session from the source storage medium, analyzing the file allocation table of the session, applying a predetermined address offset to each address in the file allocation table, and writing this file allocation table and the remaining data offset session on the destination storage medium.

This inventive method provides the same advantages as the apparatus mentioned before, so that it is refrained from repeating these advantages here. Rather, it is referred to the respective passages before.

In a preferred embodiment, said address offset is determined dependent on the physical address on said storage medium of the session to be written if the destination medium is a DVD-R medium. When writing the first session, said address offset is set to zero. Particularly, the address offset is the difference between the address space between the sessions on the destination medium and the address space between the sessions on the source medium.

Further features and advantages can be taken from the following description and the enclosed drawings.

It is to be understood that the features mentioned above and those yet to be explained below can be used not only in the respective combinations indicated, but also in other combinations or in isolation, without leaving the scope of the present invention.

BRIEF DESCRIPTION OF THE DRAWINGS

An embodiment of the invention is shown in the drawings and will be explained in more detail in the description below with reference to same. In the drawings.

DETAILED DESCRIPTION OF PREFERRED EMBODIMENTS

Figure 1:
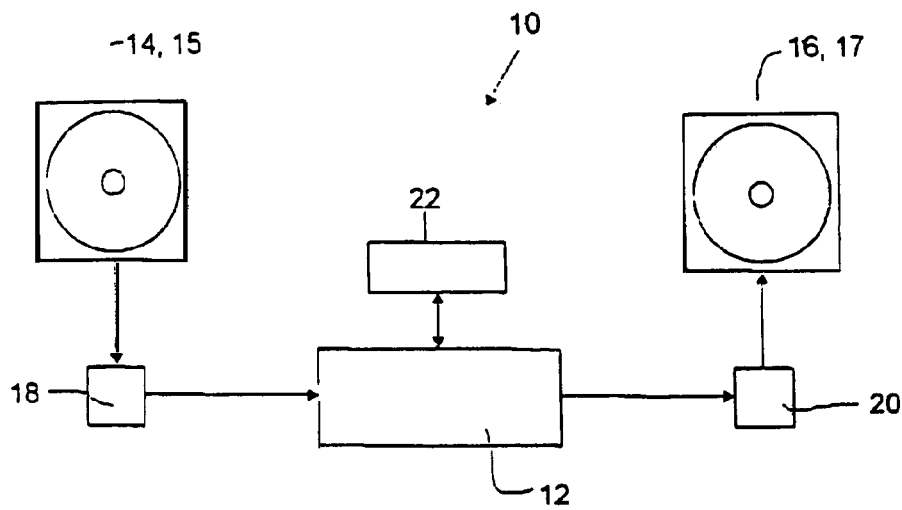
FIG. 1 schematically shows a block diagram of an apparatus according to the present invention.

In FIG. 1, an apparatus for copying data is shown and referenced with reference numeral 10. This apparatus comprises a main controller unit 12 and two DVD drives 14, 16. One of both DVD drives is a DVD player 15, whereas the other DVD drive 16 is provided as a DVD burner 17 (DVD recorder). However, it is to be noted that it would also be possible to provide just one DVD drive which allows to play and burn DVDs.

The main controller unit 12 is coupled with a first driver unit 18 assigned to the DVD player 15 and with a second driver unit 20 assigned to the DVD burner 17. Both driver units 18, 20 serve to control the operation of the respective DVD drive.

The afore-mentioned units, namely the main controller unit 12, both DVD drives 14, 16 and the driver units 18, 20, may be part of a commercial personal computer.

The main controller unit 12 is coupled with an address converting unit, which is referenced with reference numeral 22. This address converting unit 22 is adapted to analyze the data supplied by one of both DVD drives 14, 16 and to apply a predetermined address offset to specific address data of a file allocation table before transmitting these data to the other DVD drive 16, 14.

It is to be noted that although FIG. 1 shows two blocks 12, 22, the function of the address converting unit may be carried out by the main controller unit 12 as well. I.e. in other words, that the address converting unit 22 may be integrated into the controller unit 12. In case of a commercial personal computer, the main controller unit 12 and the address converting unit 22 are realized by the microprocessor of the PC.

The apparatus 10 is designed to copy a source DVD storage medium to another destination DVD storage medium, one of both media being a DVD+R medium and the other one being a DVD-R medium. Further, both DVD storage media are multi-session DVD storage media, the source DVD comprising at least two sessions to be copied.

Figure 2:
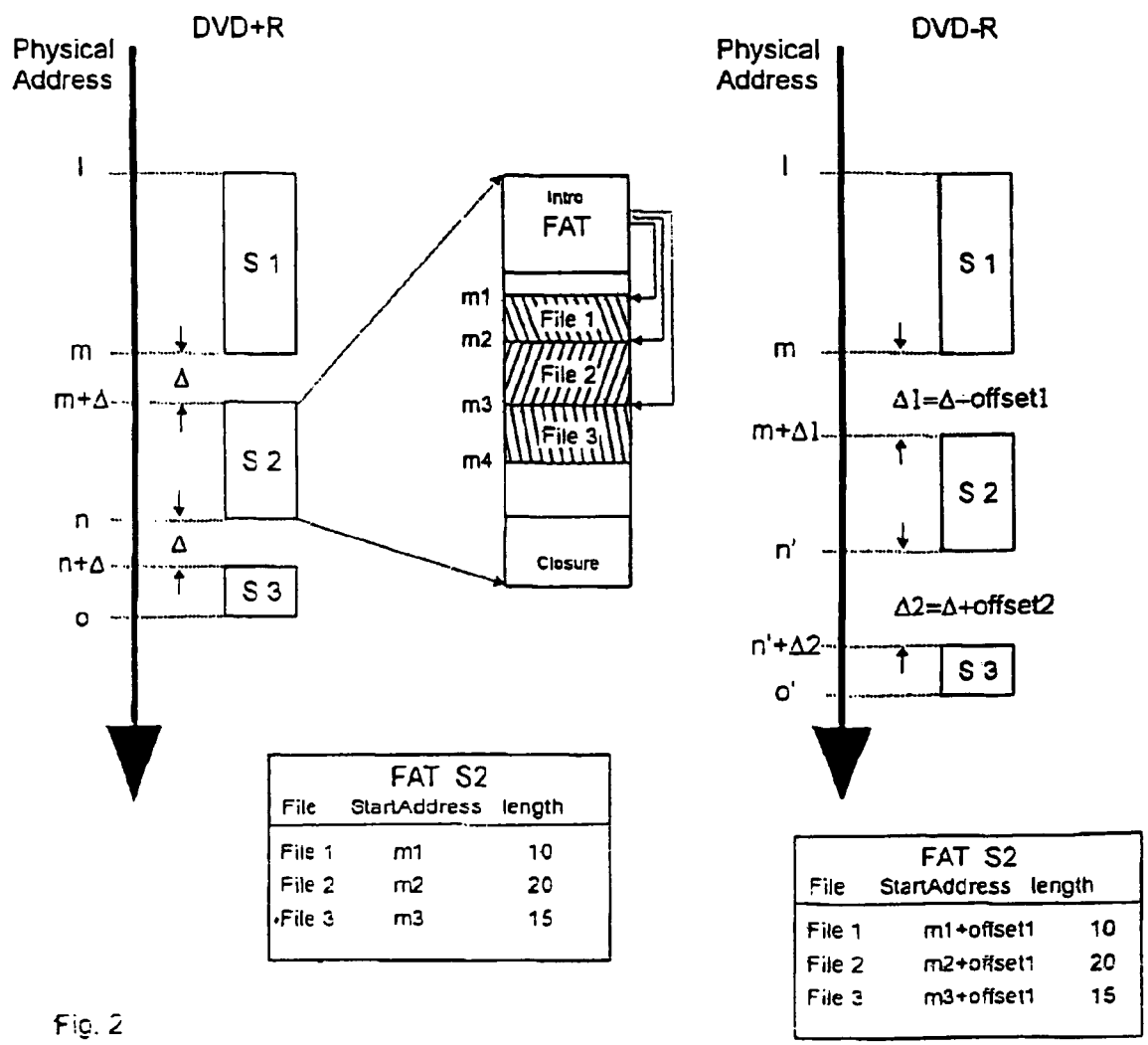
FIG. 2 shows a diagram for describing the method according to the present invention.

With reference to FIG. 2, the procedure of converting and copying data from a source DVD storage medium to a destination DVD storage medium will be described in detail.

It is assumed that in the present embodiment, the source DVD storage medium is a DVD+R medium storing three sessions S1, S2 and S3. The source DVD medium is read by the driver unit 14, and the destination is written by the driver unit 20. However, this is just one embodiment and it is not to be considered as limiting the invention.

According to the DVD+R standard, the sessions S1 to S3 are sequentially stored on the source DVD, wherein a predetermined address space between the end of one session and the start of the next session is provided. According to the DVD+R standard, this address space referenced with Δ in FIG. 2, is constant, regardless of the position of the session within the physical address room of the source DVD.

On the left hand side of FIG. 2, the vertical arrow symbolizes the physical address room of the source DVD, particularly the physical address room from address 1 to address o. It may be seen that the session S1 allocates the physical addresses between 1 and m, the second session S2 the physical addresses between m+Δ and n, and last but not least the third session S3 the physical addresses between n+Δ and o. As already mentioned before, the space between two adjacent sessions is Δ and is a fixed value over the whole physical address room.

Each session has a predetermined structure which is defined in the respective DVD+R standard. In short, each session comprises a lead-in (the first session) or an intro zone (the second and each following session), a data zone containing files etc., and a lead-out zone (the last session) or a closure zone (the remaining sessions). This structure is schematically shown in FIG. 2.

The data of the files—in the present case, for example, three files—is sequentially stored in the data zone and allocates the physical address room between addresses m1 and m4.

Within the intro or lead-in zone, a so-called file allocation table is stored. Such a file allocation table comprises respective data concerning the files in the data zone, namely at least the physical start address of each file and its length. In the present embodiment, the file allocation table contains three items, namely the start addresses and lengths for the three files. For example, file 1 starts at address m1 and has a length of 10, file 2 starts at address m2 and has a length of 20, and file 3 starts at address m3 and has a length of 15.

It is to be noted that the remaining sessions S1 and S3 have a similar structure but may contain more or less data in the data zone organized in files.

Since the data is stored on a DVD storage medium in a sequential order, the file allocation table of a session has not to comprise a link table linking sectors for storing data of a file together. Nevertheless, the present invention would also be applicable to such a system, however, would make further converting steps necessary.

As already mentioned before, the standardized address space between two adjacent sessions on a DVD-R storage medium is different to the address space used on a DVD+R storage medium. Moreover, the address space between sessions on a DVD-R medium is variable. Particularly, the address space between two sessions is determined on the basis of the physical addresses to be allocated for the respective session. For example, the address space has a first value Δ1 within a lower physical address room and, has a second value Δ2 within an upper physical address room, as shown on the right hand side of FIG. 2.

Due to the differences in address space used for multi-session DVD+R and multi-session DVD-R storage media, the physical start addresses stored in the file allocation table have to be converted when copying the sessions S1 to S3 from the DVD+R to the DVD-R storage medium.

In the present embodiment, the start addresses of the files 1 to 3 in the session S2 have to be converted by adding a value offset1, as shown in the table on the right hand side of FIG. 2. This value offset1 may be calculated by subtracting the address space value Δ used for the DVD+R medium from the system inherent address space value Δ1 used for the DVD-R medium. This address converting step is performed by the address converting unit 22 of the apparatus 10.

This address converting step is also carried out for any other session to be stored on the destination DVD-R medium with the exception of session 1 which does not need such an address conversion due to the same start address on both DVD storage media.

It is to be noted that the necessary address space between two sessions is a system inherent value and is supplied to the main controller unit 12 and the address converting unit 22 by the respective DVD driver 14, 16.

In case that the file allocation table contains more address data than the mentioned start addresses, for example addresses in a link table, these address data have to be converted in a similar manner by applying an offset value.

Moreover, it is to be noted that the described method of converting and copying sessions from a DVD+R medium to a DVD-R medium may also be carried out in the opposite direction. The apparatus 10 also allows to copy multiple sessions on a DVD-R medium to a DVD+R medium.

To sum up, the apparatus 10 and the method described above provides a possibility to copy a multi-session DVD+R storage medium to a multi-session DVD-R storage medium or vice versa.

The user has now the possibility to convert data and to create copies of DVD storage media to alleviate the problem of incompatibility between the DVD+R and the DVD-R standard.

Those skilled in the art can now appreciate from the foregoing description that the broad teachings of the present invention can be implemented in a variety of forms. Therefore, while this invention has been described in connection with a particular example thereof, the true scope of the invention should not be so limited since other modifications will become apparent to the skilled practitioner upon a study of the drawings, specification and the claims.

The invention claimed is:

1. Apparatus for copying the data content of a source multi-session DVD-storage medium to a destination multi-session DVD-storage medium, wherein the data content of the source multi-session DVD-storage medium is organized in a plurality of sequential sessions having a second session being adjacent and following a first session, wherein the second session includes a file allocation table and at least one file, the file allocation table storing at least the physical start address of each file within the session, and wherein an address space between two adjacent sessions on said source multi-session DVD-storage medium is different from an address space between two adjacent sessions on said destination multi-session DVD-storage medium, the apparatus comprising:

a read unit for reading the plurality of sequential sessions from said source storage medium, an address converting unit adapted to analyze the file allocation table of the second session of the source multi-session DVD-storage medium and to apply a predetermined address offset to each physical start address in the file allocation table of the second session to obtain a converted file allocation table of the second session, wherein the predetermined address offset depends on a difference between an address space between two adjacent sessions on said source multi-session DVD-storage and an address space between two adjacent sessions on said destination multi-session DVD-storage, a write unit for writing the plurality of sequential sessions on said destination storage medium, wherein the write unit is adapted to copy the plurality of sequential sessions, wherein the file allocation table of the second session is replaced by the converted file allocation table of the second session, and a controller unit for controlling said read unit and said write unit.

2. Apparatus of claim 1, wherein one of both storage media is a DVD+R medium and the other a DVD-R medium.

3. Apparatus of claim 2, wherein said address converting unit is adapted to select said address offset dependent on the physical start address of the session on the destination storage medium.

4. Apparatus of claim 1, wherein said address converting unit is adapted to select said address offset dependent on the physical start address of the session on the destination storage medium.

5. Apparatus of claim 1, wherein said address converting unit is adapted to not apply an address offset for the first session of the plurality of sessions before copying the first session.

6. Method for copying the data content of a source multi-session DVD-storage medium to a destination multi-session DVD-storage medium, wherein the data content of the source multi-session DVD-storage medium is organized in a plurality of sequential sessions, having a second session being adjacent and following a first session, wherein the second session includes a file allocation table and at least one file, the file allocation table storing at least the physical start address of each file within a session, and wherein an address space between two adjacent sessions on said source multi-session DVD-storage media is different from an address space between two adjacent sessions on said destination multi-session DVD-storage medium, comprising the steps:

reading the plurality of sequential sessions from the source storage medium, analyzing the file allocation table of the second session of the source multi-session DVD-storage medium, applying a predetermined address offset to each physical start address in the file allocation table of the second session to obtain a converted file allocation table of the second session, wherein the predetermined address offset depends on a difference between an address space between two adjacent sessions on said source multi-session DVD-storage and an address space between two adjacent sessions on said destination multi-session DVD-storage, and writing the plurality of sequential sessions on the destination storage medium by copying the plurality of sequential sessions to the destination storage medium, wherein the file allocation table of the second session is replaced by the converted file allocation table of the second session.

7. Method of claim 6, wherein one of the source and destination storage media is a DVD+R medium and the other of the source and destination storage media is a DVD-R medium.

8. Method of claim 7, wherein said address offset is determined dependent on the physical address on said destination medium of the session to be written if the destination medium is a DVD-R medium.

9. Method of claim 6, wherein said address offset is determined dependent on the physical address on said destination medium of the session to be written if the destination medium is a DVD-R medium.

10. Method of claim 6, wherein said address offset has the same value throughout the physical address range, when the destination storage medium is a DVD+R medium, and wherein said address offset has different values throughout the physical address range, when the destination storage medium is a DVD-R medium.

11. Method of claim 6, wherein said address offset is zero when writing the first session.

12. Method of claim 6, wherein said address offset is calculated on the basis of the address space between the session to be written and the preceding session on the source storage medium and the destination storage medium.

13. Method of claim 12, wherein said address offset is the difference between the address space between the sessions on the destination medium and the address space between the sessions on the source medium.

14. Computer program product stored on a computer usable medium, for copying the data content of a source multi-session DVD-storage medium to a destination multi-session DVD-storage medium, wherein the data content of the source multi-session DVD-storage medium is organized in a plurality of sequential sessions, having a second session being adjacent and following a first session, wherein the second session includes a file allocation table and at least one file, the file allocation table storing at least the physical start address of each file within a session, and wherein an address space between two adjacent sessions on said source multi-session DVD-storage media is different from an address space between two adjacent sessions on said destination multi-session DVD-storage medium, comprising:

reading the plurality of sequential sessions from the source storage medium, analyzing the file allocation table of the second session of the source multi-session DVD-storage medium, applying a predetermined address offset to each physical start address in the file allocation table of the second session to obtain a converted file allocation table of the second session, wherein the predetermined address offset depends on a difference between an address space between two adjacent sessions on said source multi-session DVD-storage and an address space between two adjacent sessions on said destination multi-session DVD-storage, and writing the plurality of sequential sessions on the destination storage medium by copying the plurality of sequential sessions to the destination storage medium, wherein the file allocation table of the second session is replaced by the converted file allocation table of the second session.

15. Computer program product of claim 14, wherein one of the source and destination storage media is a DVD+R medium and the other of the source and destination storage media is a DVD-R medium.

16. Computer program product of claim 15, wherein said address offset is determined dependent on the physical address on said destination medium of the session to be written if the destination medium is a DVD-R medium.

17. Computer program product of claim 14, wherein said address offset is determined dependent on the physical address on said destination medium of the session to be written if the destination medium is a DVD-R medium.

18. Computer program product of claim 14, wherein said address offset has the same value throughout the physical address range, when the destination storage medium is a DVD+R medium, and wherein said address offset has different values throughout the physical address range, when the destination storage medium is a DVD-R medium.

19. Computer program product of claim 14, wherein said address offset is zero when writing the first session.

20. Computer program product of claim 14, wherein said address offset is calculated on the basis of the address space between the session to be written and the preceding session on the source storage medium and the destination storage medium.

21. Computer program product of claim 20, wherein said address offset is the difference between the address space between the sessions on the destination medium and the address space between the sessions on the source medium.

* * * * *